United States Patent
Raymond et al.

(10) Patent No.: US 8,195,110 B2
(45) Date of Patent: Jun. 5, 2012

(54) METHOD FOR CALIBRATING A TRANSMISSION LINE, AND CORRESPONDING COMPUTER SOFTWARE PRODUCT, STORAGE MEDIUM AND CALIBRATION DEVICE

(75) Inventors: François Raymond, Verdun sur Garonne (FR); Jacques Goriaux, Versailles (FR); Alain Bironneau, La Varenne (FR)

(73) Assignee: Sierra Wireless, Issy les Moulineaux (FR)

( * ) Notice: Subject to any disclaimer, the term of this patent is extended or adjusted under 35 U.S.C. 154(b) by 0 days.

(21) Appl. No.: 12/741,306

(22) PCT Filed: Nov. 21, 2008

(86) PCT No.: PCT/EP2008/065983
§ 371 (c)(1),
(2), (4) Date: Jan. 26, 2011

(87) PCT Pub. No.: WO2009/071453
PCT Pub. Date: Jun. 11, 2009

(65) Prior Publication Data
US 2011/0117865 A1    May 19, 2011

(30) Foreign Application Priority Data
Dec. 3, 2007 (FR) ...................... 07 59524

(51) Int. Cl.
*H04B 1/04* (2006.01)
(52) U.S. Cl. ................. 455/127.1; 455/232.1; 455/115.1
(58) Field of Classification Search .... 455/232.1–253.2, 455/127.1–127.5, 115.1–115.4, 67.11–67.16
See application file for complete search history.

(56) References Cited

U.S. PATENT DOCUMENTS

| | | | |
|---|---|---|---|
| 6,324,228 B1 | 11/2001 | Millward et al. | |
| 7,580,680 B2 * | 8/2009 | Isaac et al. | 455/67.11 |
| 7,995,976 B2 * | 8/2011 | Braithwaite | 455/232.1 |
| 8,073,409 B2 * | 12/2011 | Vaidyanathan et al. | 455/115.1 |
| 2003/0157912 A1 * | 8/2003 | Atkinson et al. | 455/234.1 |
| 2004/0192236 A1 * | 9/2004 | Yang et al. | 455/127.2 |
| 2005/0227645 A1 * | 10/2005 | Sudo | 455/127.2 |
| 2009/0298440 A1 * | 12/2009 | Takeya et al. | 455/67.14 |

FOREIGN PATENT DOCUMENTS

| WO | 0167621 A2 | 9/2001 |
|---|---|---|
| WO | 2004100396 A1 | 11/2004 |

OTHER PUBLICATIONS

French Search Report dated Jul. 7, 2008 for corresponding French Application No. 0759524, filed Dec. 3, 2007.

(Continued)

*Primary Examiner* — Lana N Le
(74) *Attorney, Agent, or Firm* — David D. Brush; Westman, Champlin & Kelly, P.A.

(57) ABSTRACT

A method and apparatus are provided for calibrating an information-signal transmission line that includes elements for generating a control signal and transmitting information signals controlled by the control signals, and an amplifier of the information signals. The amplifier can be configured according to at least a first gain configuration associated with a first gain value, and a second gain configuration associated with a second gain value. The method includes obtaining, for each of the first and second gain configurations, first and second sets of initial values of the control signal, that correspond to first and second sets of measured power that overlap, and selecting, for each power-recovery setpoint value to which corresponds a first measured-power value of the first set and a second measured-power value of the second set, from the first and second calibrated values of the control signal, the calibrated value that meets a predetermined criterion.

8 Claims, 2 Drawing Sheets

OTHER PUBLICATIONS

International Search Report dated Dec. 22, 2008 for corresponding International Application No. PCT/EP2008/065983, filed Nov. 21, 2008.
"Base Stations for Mobile Telephony (UMTS-FDD) Recommendation on Measurements", project from Sep. 17, 2003, published on the Internet site www.environment-suisse.ch/electrosmog, UMTS technology (for Universal Mobile Communication System).
International Preliminary Report on Patentability and Written Opinion dated Jun. 19, 2010 for corresponding International Application No. PCT/EP2008/065983, filed Nov. 21, 2008.

* cited by examiner

METHOD FOR CALIBRATING A TRANSMISSION LINE, AND CORRESPONDING COMPUTER SOFTWARE PRODUCT, STORAGE MEDIUM AND CALIBRATION DEVICE

CROSS-REFERENCE TO RELATED APPLICATIONS

This Application is a Section 371 National Stage Application of International Application No. PCT/EP2008/065983, filed Nov. 21, 2008 and published as WO 2009/071453 on Jun. 11, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radiocommunication networks, and more particularly that of transmission lines in such networks.

The disclosure relates more precisely to the calibrating of such transmission lines comprising an amplifier that can have several gain configurations.

BACKGROUND OF THE DISCLOSURE

Such as explained by the article "Base stations for mobile telephony (UMTS-FDD) recommendation on measurements", project from 17 Sep. 2003, published on the Internet site www.environnement-suisse.ch/electrosmog, UMTS technology (for "Universal Mobile Communication System") is a third generation mobile telephone technology. Each telecommunication operator operates their own UMTS network.

UMTS radiocommunication systems make it possible to transmit data flows that are clearly higher than the radiocommunication systems compliant with the GSM standard (for "Global System for Mobile"). They are as such indicated not only for voice traffic but also for the transmission of digital images or videos.

In a radiocommunication system, each radiocommunication terminal comprises a transmission line in order to be able to transmit information in the radiocommunication network wherein it is provided to operate.

In relation with FIG. 1, a simplified diagram is shown of a conventional transmission line 100 comprising a power amplifier.

The transmission line 100 comprises an analogue/digital converter 101 (hereinafter designated by ADC 101) which transmits a control signal to a transmitter 102. The transmitter 102 generates an information signal (carrying the information to be transmitted in the network) and transmits it to the power amplifier 103 so that the latter amplifies, before transmitting in the network via an antenna (not shown), the information signal. An output 104 of the power amplifier 103 is connected to a calibrating point 105 which makes it possible to measure the output power of the power amplifier 103 during the calibrating of the line 100.

On the control of the power of the amplifier 103 of the transmission line 100, the GSM standard is much less restrictive than the UMTS standard. Indeed, for example, according to the GSM900 standard, the power servo must be carried out in steps of 2 dB with a precision which ranges from +/−2 dB to +/−5 dB according to the power level between each step and this for an output power ranging between 33 dBm and 5 dBm while, according to the UMTS standard, the power servo must be carried out in steps of 1 dB with a precision of +/−0.5 dB between each step and this for an output power ranging between +21 dBm and −50 dBm.

Within the framework of transmission lines compliant with the GSM standard, the power amplifier 103 is conventionally a nonlinear power amplifier that operates in compressed mode. The power level at the output of the transmitter 102 is fixed, it is the only application, by means of the control signal, by the ADC 101 to the amplifier 103, via the transmitter 102, of a power setpoint which makes it possible to directly manage the output power levels of the amplifier 103. In this case, in order to carry out the calibrating, according to the mode for coupling and mode for detecting the output power of the amplifier, it is sufficient to take two to four measuring points.

Among the transmission lines compliant with the UMTS standard (hereinafter called UMTS transmission lines), first UMTS transmission lines use a fixed-gain amplifier. These amplifiers are more linear than the amplifiers of GSM transmission lines as they are specifically polarised for this single gain. Such transmission lines require only a few calibrating points, simple linear or polynomial sections obtained using a few measuring points is sufficient for carrying out the calibrating of the transmission line and as such comply with the UMTS standard.

However, second transmission lines compliant with the UMTS standard use a double-gain amplifier: which can be configured in such a way as to have a low gain or configured in such a way as to have a high gain.

The calibrating of these second transmission lines is complex due to the restrictions imposed by the UMTS standard in particular in terms of precision on the step of the power servo of the amplifier and the fact that the amplifier is a double-gain amplifier.

The application of the conventional techniques for calibrating first UMTS lines by section of the polynomial or linear type with these second UMTS lines does not procure enough precision in particular on switching from the low gain configuration to the high gain configuration (or inversely) of the amplifier. Moreover, these conventional techniques are not very robust with regards to the gain dispersion of the transmission line.

SUMMARY

In accordance with a particular embodiment, the invention relates to a method for calibrating an information-signal transmission line, said line comprising means for generating (201) a control signal, means for transmitting (202) information signals controlled by said control signal and an amplifier (203) of said information signals, said amplifier able to be configured according to at least one first gain configuration associated with a first gain value and a second gain configuration associated to a second gain value. This method comprises the following steps:

obtaining, for said first gain configuration, a first plurality of first initial values VCAN1(i) of the control signal and, for said second gain configuration, a second plurality of second initial values VCAN2(i) of the control signal;

for each of the first initial values VCAN1(i) of the control signal, obtaining a first measured value PMES1(i) of the output power of the amplifier and for each of the second initial values VCAN2(i) of the control signal, obtaining a second measured value PMES2(i) of the output power of the amplifier;

said first and second pluralities of initial values being such that the range of values of a first set formed by the first measured values PMES1(i) of the output power and the range of values of a second set formed by the second measured values PMES2(i) of the output power overlap, for at least one setpoint value called the recovery value PCON(i) of the output power of the amplifier, among the first measured values of the output power, obtaining the first measured value PMES1(j) of the output power closest to said recovery setpoint value PCON (i), among the second measured values of the output power, obtaining the second measured value PMES2(k) of the output power closest to said recovery setpoint value PCON(i);

calculating, using a first modelling of the polynomial type associated with said closest first measured value PMES (j), a first calibrated value VCANCAL1(i) of the control signal corresponding to said recovery setpoint value PCON(i);

calculating, using a second modelling of the polynomial type associated with said second closest measured value PMES(k), a second calibrated value VCANCAL2(i) of the control signal corresponding to said recovery setpoint value PCON(i);

selecting one of said first and second calibrated values according to at least one predetermined criterion;

and, said selecting step comprises the following steps:

determining a recovery setpoint value called switching according to a predetermined criterion or predetermined criteria;

for each recovery setpoint value strictly less than the switching recovery setpoint value, selecting the first calibrated value;

for each recovery setpoint value greater than or equal to the switching recovery setpoint value, selecting the second calibrated value.

The general principle of an embodiment of the invention consists in obtaining for each of the first and second gain configuration first and second sets of initial values of the control signal such as they correspond to the first and second sets of measured power which overlap and in selecting, for each recovery setpoint value the power to which corresponds a first measured-power value of the first set and a second measured-power value of the second set, among the first and second calibrated values of the control signal calculated using each of the first and second measured-power values, the calibrated value satisfying the predetermined criterion.

As such, thanks to this obtaining of first and second calibrated values, corresponding respectively to the first and second gain configuration, for the same setpoint value of the power and this for at least one setpoint power value, an embodiment of the invention provides a calibrating technique for a transmission line which is more precise than the conventional techniques and in particular on switching from the first gain configuration to the second gain configuration of the amplifier or inversely.

As such, the method for calibrating according to an embodiment of the invention makes transparent the gain dispersions in the first and second gain configurations of the amplifier and is thus robust with regards to the gain dispersions. In this way, it is possible to maintain a good precision for the step (for example a step of 1 dB+/−0.2 dB can be obtained), even during the switching from the first gain configuration to the second gain configuration of the amplifier.

Indeed, thanks to the method of calibrating according to an embodiment of the invention, the precision of the step (i.e. the precision on the difference between two consecutive power levels) is linked:

to the fact that the relative measurement error of two consecutive powers due to the device for measuring is negligible for a variation of 1 dB;

to the fact that the rounding error on the calculation of each of the two setpoints of the means for generating the control signal (for example an analogue/digital converter), which makes it possible to obtain two consecutive powers, is of a magnitude of 0.1 dB+0.1 dB=0.2 dB.

As such, a precision of the maximum step of a magnitude of 1+/0.2 dB can be obtained, and this, independently of the gain used.

Preferentially, the predetermined criterion or predetermined criteria belong to the group including:

the minimization of an electrical consumption of the amplifier of the transmission line;

compliance with at least one condition linked to the noise generated by the amplifier.

Preferentially, said group further comprises the following criterion: the taking into account of the influence of the temperature of the amplifier on the properties of the amplifier.

Advantageously, the method comprises the following steps:

determining a reference switching recovery setpoint value for a given reference temperature;

obtaining a current temperature of the amplifier;

determining a current switching recovery setpoint value according to the current temperature and said reference switching recovery setpoint value.

As such, the method of calibrating according to an embodiment of the invention makes it possible to offset the effects of any deviation of the temperature of the amplifier in relation to the reference temperature.

According to an embodiment in accordance with the invention, said transmission line of information signals is a line compliant with the UMTS standard.

Advantageously, the amplifier is a double-gain power amplifier.

An embodiment of the invention further relates to a computer software product which can be downloaded from a communication network and/or recorded on a medium that can be read by computer and/or that can be executed by a processor, said computer software product comprising program code instructions for the execution of the steps of the method of calibrating such as described previously, when said program is executed on a computer.

An embodiment of the invention further relates to a storage medium, which may be totally or partially removable, that can be read by a computer, storing a set of instructions that can be executed by said computer in order to implement the method of calibrating such as described previously.

An embodiment of the invention further relates to a device for calibrating a transmission line of information signals, said line comprising means for generating a control signal, means for transmitting information signals controlled by said control signal and an amplifier of said information signals, said amplifier able to be configured according to at least one first gain configuration associated with a first gain value and a second gain configuration associated with a second gain value. This device comprises:

means of obtaining, for said first gain configuration, a first plurality of first initial values VCAN1(i) of the control signal and, for said second gain configuration, a second plurality of second initial values VCAN2(i) of the control signal;

for each of the first initial values VCAN1(i) of the control signal, means of obtaining a first measured value PMES1(i) of the output power of the amplifier and for each of the second initial values VCAN2(i) of the control signal, obtaining a second measured value PMES2(i) of the output power of the amplifier;

said first and second pluralities of initial values being such that the range of values of a first set formed by the first measured values PMES1(i) of the output power and the range of values of a second set formed by the second measured values PMES2(i) of the output power overlap, for at least one setpoint value called the recovery value PCON(i) of the output power of the amplifier, among the first measured values of the output power, means of obtaining the first measured value PMES1 (j) of the output power closest to said recovery setpoint value PCON(i), among the second measured values of the output power, means for obtaining the second measured value PMES2(k) of the output power closest to said recovery setpoint value PCON(i);

means for calculating, using a first modelling of the polynomial type associated with said first closest measured value PMES(j), a first calibrated value VCANCAL1(i) of the control signal corresponding to said recovery setpoint value PCON(i);

means for calculating, using a second modelling of the polynomial type associated with said closest second measured value PMES(k), a second calibrated value VCANCAL2(i) of the control signal corresponding to said recovery setpoint value PCON(i);

means for selecting one of said first and second calibrated values according to at least one predetermined criterion;

said means for selecting include:

means for determining a recovery setpoint value, called switching recovery setpoint value, according to a predetermined criterion or predetermined criteria;

means for selecting the first calibrated value, activated for each recovery setpoint value determined strictly less than the switching recovery setpoint value;

means for selecting the second calibrated value, activated for each recovery setpoint value determined greater than or equal to the switching recovery setpoint value.

The advantages of the computer software product, storage medium and device for calibrating are the same as those of the aforementioned method of calibrating; they are not detailed any further.

BRIEF DESCRIPTION OF THE DRAWINGS

Other characteristics and advantages shall appear more clearly when reading the following description of a preferred embodiment, provided as a simple and non-restricted example, and the annexed drawings, where among.

DETAILED DESCRIPTION OF ILLUSTRATIVE EMBODIMENTS

1. Description of a Particular Embodiment of the Invention

Figure 1:
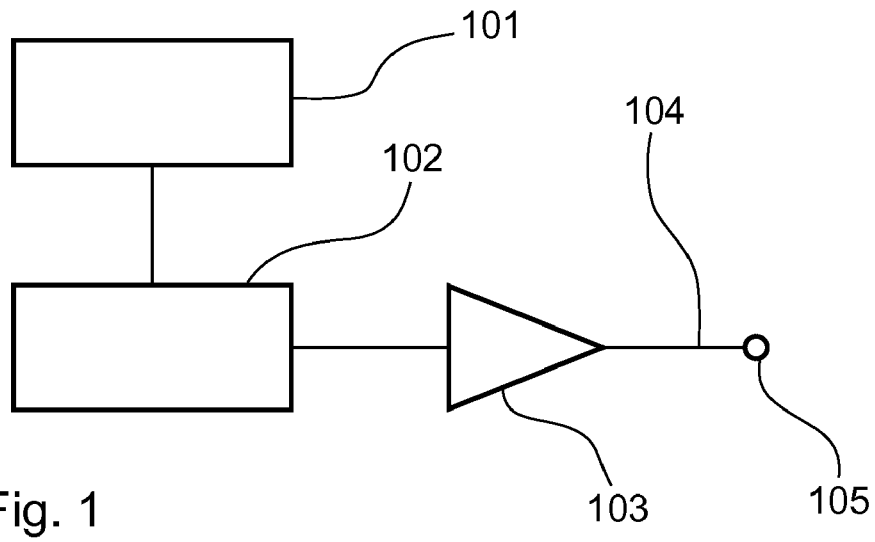
FIG. 1 shows a simplified diagram of a conventional transmission line comprising a power amplifier.
Figure 2:
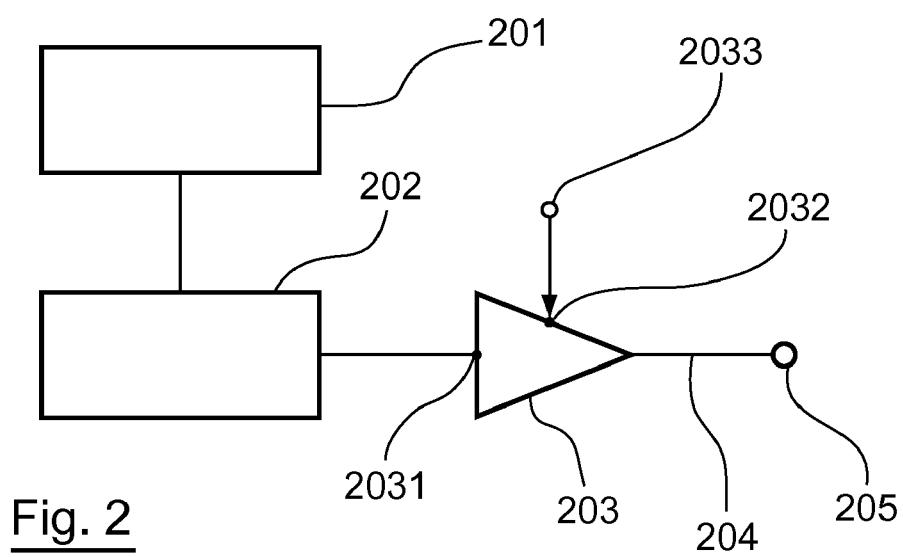
FIG. 2 shows a simplified diagram of a UMTS transmission line comprising a double-gain power amplifier for which can be implemented the method of calibrating according to a particular embodiment of the invention.

In relation with FIG. 2, a simplified diagram is shown of a UMTS transmission line 200 comprising a double-gain power amplifier for which can be implemented the method of calibrating according to a particular embodiment of the invention.

The transmission line 200 comprises an analogue/digital converter 201 (hereinafter designated by ADC 201) which transmits a control signal to a transmitter 202, it as such controls the output power level of the transmitter 202. The transmitter 202 generates an information signal (carrying the information to be transmitted in the network) and transmits it to a first input 2031 of the power amplifier 203 so that the latter amplifies, before transmitting in the network via an antenna (not shown), the information signal. An output 204 of the power amplifier 203 is connected to a calibrating point 205 which makes it possible to measure the output power of the power amplifier 203 when implementing the method of calibrating according to an embodiment of the invention hereinafter described in relation with FIG. 3.

Furthermore, due to the fact that the amplifier is a double gain amplifier (can be configured in a low gain configuration in a high gain configuration), a control signal 2033, which is a logic signal, is applied to a second input 2032 of the amplifier 203 and makes it possible to select the high gain or low gain configuration of the amplifier 203. The low gain and high gain configurations are linked to the output power level which is delivered at the output of the power amplifier 203. For example, for an output power less than 5 dBm, the amplifier 203 is configured as low gain (it has a first gain value which is the low gain) while for an output power greater than 5 dBm, it is configured as high gain (it has a second gain value which is the high gain). This borderline value of the output power can of course change, in such a way as to optimize the output of the transmission line 200.

Figure 3:
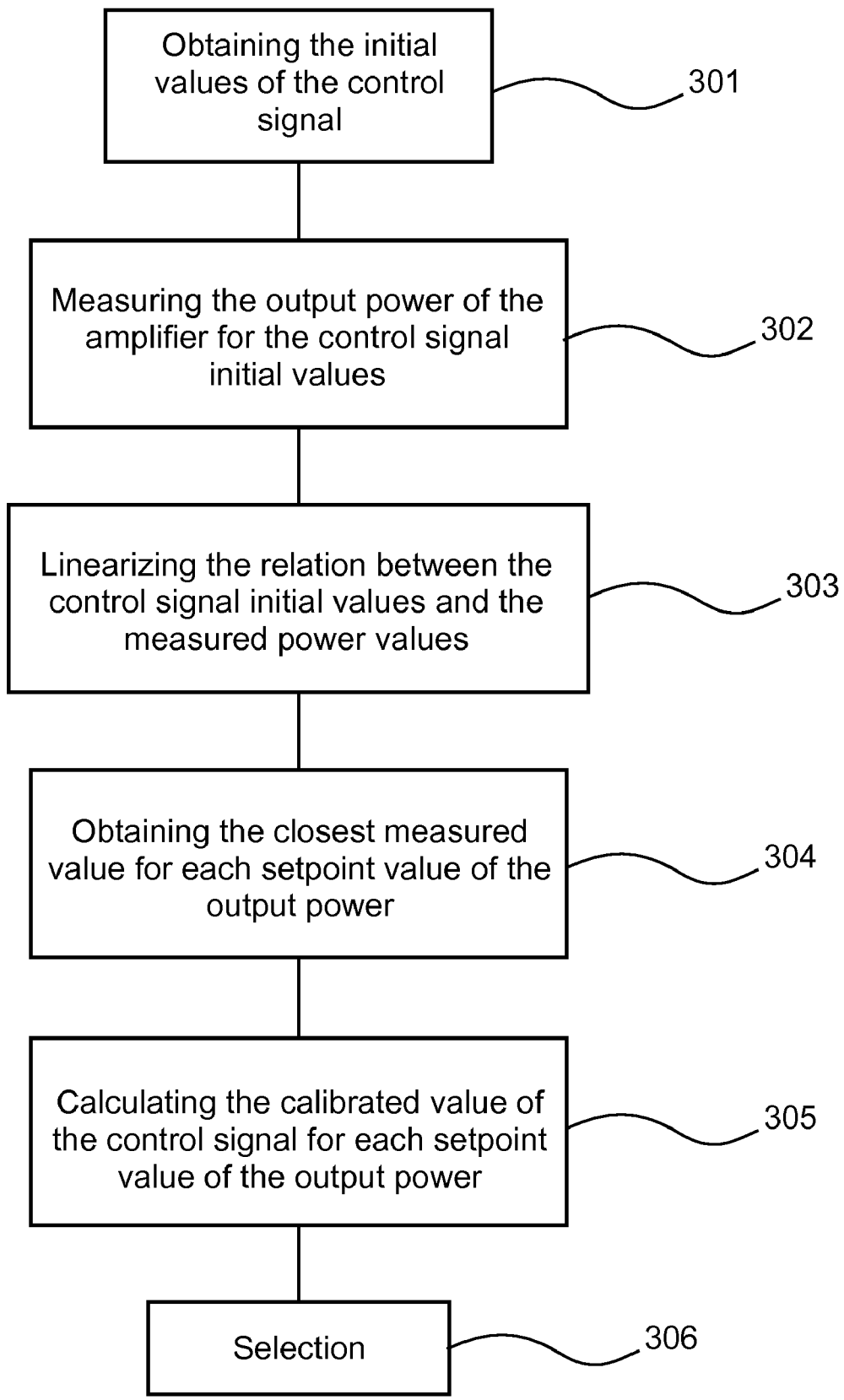
FIG. 3 shows the main steps of a method of calibrating of the transmission line in FIG. 2 according to a particular embodiment of the invention.

In relation with FIG. 3, the main steps are shown of a method of calibrating the transmission line 200 in FIG. 2 according to a particular embodiment of the invention. For example, the method of calibrating according to a particular embodiment of the invention is implemented by a device for calibrating hereinafter described in relation with FIG. 4.

Recall that the UMTS standard, imposes a power servo that must be carried out in steps of 1 dB with a precision of +/−0.5 dB between each step and this for an output power ranging between +21 dBm and −50 dBm.

As such, in order to sweep a range of values of the setpoint output power of the power amplifier 203 which comprises the range (from +21 dBm to −50 dBm) imposed by the UMTS standard with the step of 1 dB imposed by the UMTS standard, in a step 301, one hundred initial values are defined (or are obtained from a user via a graphic interface or a memory) of the control signal (delivered by the ADC 201) referenced VCAN(0) to VCAN(100):

the initial values VCAN(0) to VCAN(29) which correspond respectively to the setpoint values PCON(0) to PCON(29) of the output power decreasing by steps of 1 dBm from 25 dBm to −4 dBm and which correspond to the high gain configuration of the power amplifier 203; the initial values VCAN(30) to VCAN(100) which correspond respectively to the setpoint values PCON(30) to PCON(100) of the output power decreasing by steps of 1 dBm from 12 dBm to −57 dBm and which correspond to the low gain configuration of the power amplifier 203.

As such, to each of the setpoint values −4 dBm to 12 dBm, of the amplifier 203 corresponds at least one first initial value VCAN of the control signal corresponding to the high gain and a second initial value VCAN of the control signal corresponding to the low gain.

Then, during a sweeping of the initial values VCAN(0) to VCAN(100) of the control signal of the ADC 201, to each of which is associated a value (low gain or high gain) of the gain of the amplifier 203, preferentially by measuring (step 302), the output power is obtained of the amplifier 203 on the calibrating point 205. This measurement can be carried out with any type of device able to measure an electrical power (such as a power measurer, a tester dedicated to UMTS, etc.). One hundred measured values are as such obtained of the output power of the amplifier 203 referenced PMES(0) to PMES(100) and which correspond respectively to the initial values VCAN(0) to VCAN(100) of the control signal. Preferentially, the measured values PMES(0) to PMES(100) of the output power are logged in a memory 41 of the device for calibrating hereinafter described in relation with FIG. 4.

In this way, the one hundred initial values VCAN(0) to VCAN(100) of the control signal can be correlated to the one hundred measured-power values PMES(0) to PMES(100) and to the two gains (low gain, high gain).

Indeed, with this data, it is now possible to carry out a modelling of the polynomial type (step 303), for example, a linearization of the relation between the initial values VCAN(0) to VCAN(100) of the control signal and the measured-power values PMES(0) to PMES(100) according to VCAN$(n)=a(n)$ PMES$(n)+b(n)$ where the step n varies from 0 to 100 and a and b are functions of n. A first table is thus obtained and is provided in appendix 1 wherein is associated to the high gain configuration the value 1 and to the low gain configuration the value 0.

Within the framework of this linearization, the values $a(n)$ and $b(n)$ are obtained by means of the following expressions:

for the steps $n=0$ and $n=31$:

$$a(n)=(VCAN(n)-VCAN(n+1))/(PMES(n)-PMES(n+1))$$

$$b(n)=VCAN(n)-a*PMES(n)$$

for the steps $n=30$ and $n=99$:

$$a(n)=(VCAN(n-1)-VCAN(n))/(PMES(n-1)-PMES(n))$$

$$b(n)=VCAN(n)-a*PMES(n)$$

for the other steps (n=1 to 29 and 32 to 98):

$$a(n)=(VCAN(n-1)-VCAN(n+1))/(PMES(n-1)-PMES(n+1))$$

$$b(n)=VCAN(n)-a*PMES(n).$$

Then, for each setpoint value PCON(i) of the output power (for example for the setpoint value PCON(i) corresponding to the step i, i between 0 and 100), the measured value PMES(n) of the output power closest to the setpoint value PCON(i) is obtained (step 304).

Then, the coefficients $a(n)$ and $b(n)$ of the closest measured value PMES(n) are made to correspond to the setpoint value PCON(i). It is then possible to calculate (step 305), using the coefficients $a(n)$ and $b(n)$ of the linearization associated with the measured value PMES(n) closest to the setpoint value PCON(i), a calibrated value VCANCAL(i) of the control signal (delivered by the ADC 201) corresponding to the setpoint value PCON(i) thanks to the following expression:

$$VCANCAL(i)=a(n)*PCON(i)+b(n)$$

A second table is thus obtained and is provided in appendix 2 wherein is associated to the high gain configuration the value 1 and to the low gain configuration the value 0.

As such, to each of the setpoint values, called recovery, of the output power between 12 dBm and −4 dBm, is associated a first calibrated value of the control signal associated with the first gain value (low gain) and a second calibrated value of the control signal associated with the second gain value (high gain).

A recovery setpoint value of the output power is then determined, called switch setpoint value, according to at least one of the following two criteria:

the minimization of the electrical consumption of the amplifier of the transmission line. Indeed, the lowest possible consumption is desired. The amplifier however consumes more with the high gain than with the low gain. It is therefore desired to use the low gain for as long as possible;

the compliance with at least one condition linked to the noise generated by the amplifier. For example, one of the restrictions of the UMTS standard which affects the choice of the switching zone if the ACLR (Adjacent Channel Leakage Ratio). However, the amplifier does not hold this restriction beyond a certain power level obtained for the low gain. This level defines the switching zone.

For example, the switching recovery setpoint value of the output power is 5 dBm.

Preferentially, in order to take into account any deviation in temperature of the properties of the amplifier, a reference switching recovery setpoint value can be determined for a given reference temperature (for example the ambient temperature) then, after measuring the current temperature of the amplifier, determining the current switching recovery setpoint value (at the current temperature) according to the current temperature and the reference switching recovery setpoint value via digital extrapolation.

As such for example, if the switching recovery setpoint value of the output power is 5 dBm at an ambient temperature of 20° C. and it decreases by −0.1 dBm with an increase of +1° C. in the temperature, then at 30° C., the switching recovery setpoint value of the output power is 4 dBm.

Then, for each recovery setpoint value of the power strictly less than the switching recovery setpoint value of the power, the first calibrated value of the control signal associated with the first gain value (low gain) is selected and for each recovery setpoint value of the power greater than or equal to the switching recovery setpoint value of the power, the second calibrated value of the control signal associated with the second gain value (high gain) is selected.

As such, then, the following are selected (step 306):

the calibrated values VCANCAL(0) to VCANCAL(20) of the control signal which correspond to the high gain configuration and respectively to the setpoint values of the output power PCON(0) to PCON(20) decreasing by steps of 1 dBm from 25 dBm to 5 dBm;

the calibrated values VCANCAL(38) to VCANCAL(100) of the control signal which correspond to the low gain configuration and respectively to the setpoint values of the output power PCON(38) to PCON(100) decreasing by steps of 1 dBm from 4 dBm to −57 dBm.

A third table is thus obtained and is provided in appendix 3 wherein are shown only the lines associated with the 84 calibrated values VCANCAL(0) to VCANCAL(20) and VCANCAL(38) to VCANCAL(100).

The values selected as such make it possible to have at each incrementation step a variation in power of 1 dB.

The dispersion in frequency between the high gain configuration and the low gain configuration is substantial on double-gain power amplifiers such as the power amplifier 203. In order to comply with the UMTS standard, it is imperative to carry out a calibrating on as many frequencies as required. This is the only way to avoid exceeding the 1 dB+/−0.5 dB imposed by the UMTS standard, in particular when switching from the high gain configuration to the low gain configuration.

It is for this reason that, within the framework of this particular embodiment, in the high gain configuration, the output power corresponding to a setpoint value of the output power descending to −4 dBm is measured and, in the low gain configuration, the output power corresponding to a setpoint value of the output power rising up to 12 dBm.

The values with numbers indicated in the description of FIGS. 2 and 3 are provided for the purposes of illustration and are not restricted; they can vary according to the choices and the components in terms of the transmission line 200.

It has been chosen within the framework of this particular embodiment of the invention to implement, in the step 303, a modelling of the polynomial type which is a linearization (using calculation rules of the linear type), however, in the alternatives of this particular embodiment of the invention, it can also be chosen to implement any type of polynomial modelling (using calculation rules of the polynomial type) if the type of power amplifier used so requires.

As such, the method of calibrating according to the particular embodiment of the invention makes transparent the dispersions of high gain and the dispersions of low gain of the power amplifier 203. In this way, it is possible to maintain a step of 1 dB+/−0.5 dB, even during the switching from the high gain configuration to the low gain configuration of the power amplifier 203.

Figure 4:
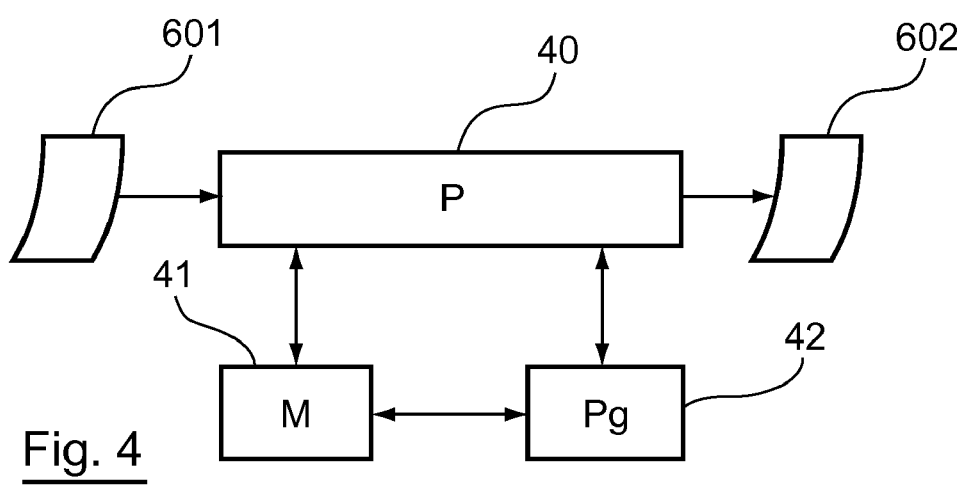
FIG. 4 shows a simplified diagram of a device for calibrating in accordance with a particular embodiment of the invention.

FIG. 4 shows a simplified diagram of a device for calibrating in accordance with a particular embodiment of the invention, which comprises a memory M 41 (for example a RAM memory), a processing unit P 40, provided for example with a microprocessor, and controlled by the computer program (or application) Pg 42 implementing certain steps of the method according to an embodiment of the invention described in FIG. 3.

At initialization, the code instructions of the computer program 42 are for example loaded into the RAM memory 41 before being executed by the microprocessor of the processing unit 40. The processing unit 40 obtains the initial values VCAN(0) to VCAN(100) of the control signal, the measured values PMES(0) to PMES(100) of the output power are stored in the memory 41 and the microprocessor of the processing unit 40 delivers as output the 84 calibrated values VCANCAL(0) to VCANCAL(20) and VCANCAL(38) to VCANCAL(100) of the control signal.

At least one embodiment of the disclosure provides a calibrating technique for a transmission line comprising a power amplifier to at least one first and one second gain configurations which are more precise than the conventional techniques.

An embodiment provides such a technique which has a high precision on switching from the first gain configuration to the second gain configuration of the amplifier or inversely.

An embodiment provides such a technique which is robust with regards to the gain dispersions of the transmission line.

An embodiment provides such a technique that is simple to implement and at a low cost.

2.

APPENDIX 1

| N | Step n | Gain | Initial value of the ADC | Measured power | Co-efficient a | Co-efficient b |
|---|---|---|---|---|---|---|
| n = 0 | 0 | 1 | VCAN(0) | PMES(0) | a(0) | b(0) |
| n = n + 1 | 1 | 1 | VCAN(1) | PMES(1) | a(1) | b(1) |
| n = n + 1 | 2 | 1 | VCAN(2) | PMES(2) | a(2) | b(2) |
| n = n + 1 | 3 | 1 | VCAN(3) | PMES(3) | a(3) | b1(3) |
| ... | ... | ... | ... | ... | ... | ... |
| ... | ... | ... | ... | ... | ... | ... |
| ... | ... | ... | ... | ... | ... | ... |
| n = n + 1 | 28 | 1 | VCAN(28) | PMES(28) | a(28) | b(28) |
| n = n + 1 | 29 | 1 | VCAN(29) | PMES(29) | a(29) | b(29) |
| n = n + 1 | 30 | 0 | VCAN(30) | PMES(30) | a(30) | b(30) |
| n = n + 1 | 31 | 0 | VCAN(31) | PMES(31) | a(31) | b(31) |
| n = n + 1 | 32 | 0 | VCAN(32) | PMES(32) | a(32) | b(32) |
| n = n + 1 | 33 | 0 | VCAN(33) | PMES(33) | a(33) | b(33) |
| ... | ... | ... | ... | ... | ... | ... |
| ... | ... | ... | ... | ... | ... | ... |
| ... | ... | ... | ... | ... | ... | ... |
| n = n + 1 | 99 | 0 | VCAN(99) | PMES(99) | a(99) | b(99) |
| n = n + 1 | 100 | 0 | VCAN(100) | PMES(100) | a(100) | b(100) |

3.

APPENDIX 2

| STEP i = 0 | Step i | Gain | Setpoint power in dBm | Calibrated value of the ADC |
|---|---|---|---|---|
| i | 0 | 1 | PCON(0) = 25 | VCANCAL(0) |
| i = i + 1 | 1 | 1 | PCON(1) = 24 | VCANCAL(1) |
| i = i + 1 | 2 | 1 | PCON(2) = 23 | VCANCAL(2) |
| i = i + 1 | 3 | 1 | PCON(3) = 22 | VCANCAL(3) |
| ... | ... | ... | ... | ... |
| ... | ... | ... | ... | ... |
| ... | ... | ... | ... | ... |
| i = i + 1 | 28 | 1 | PCON(28) = −3 | VCANCAL(28) |
| i = i + 1 | 29 | 1 | PCON(29) = −4 | VCANCAL(29) |
| i = i + 1 | 30 | 0 | PCON(30) = 12 | VCANCAL(30) |
| i = i + 1 | 31 | 0 | PCON(31) = 11 | VCANCAL(31) |
| i = i + 1 | 32 | 0 | PCON(32) = 10 | VCANCAL(32) |
| i = i + 1 | 33 | 0 | PCON(33) = 9 | VCANCAL(33) |
| ... | ... | ... | ... | ... |
| ... | ... | ... | ... | ... |
| ... | ... | ... | ... | ... |
| i = i + 1 | 98 | 0 | PCON(98) = −55 | VCANCAL(98) |
| i = i + 1 | 99 | 0 | PCON(99) = −56 | VCANCAL(99) |
| i = i + 1 | 100 | 0 | PCON(100) = −57 | VCANCAL(100) |

4.

APPENDIX 3

| Gain | Setpoint power in dBm | Calibrated value of the ADC |
|---|---|---|
| 1 | PCON(0) = 25 | VCANCAL(0) |
| 1 | PCON(1) = 24 | VCANCAL(1) |
| 1 | PCON(2) = 23 | VCANCAL(2) |
| 1 | PCON(3) = 22 | VCANCAL(3) |
| ... | ... | ... |
| ... | ... | ... |
| ... | ... | ... |
| 1 | PCON(19) = 6 | VCANCAL(28) |
| 1 | PCON(20) = 5 | VCANCAL(29) |

APPENDIX 3-continued

| Gain | Setpoint power in dBm | Calibrated value of the ADC |
|---|---|---|
| 0 | PCON(38) = 4 | VCANCAL(30) |
| 0 | PCON(39) = 3 | VCANCAL(31) |
| 0 | PCON(40) = 2 | VCANCAL(32) |
| 0 | PCON(41) = 1 | VCANCAL(33) |
| ... | ... | ... |
| ... | ... | ... |
| ... | ... | ... |
| 0 | PCON(98) = −55 | VCANCAL(98) |
| 0 | PCON(99) = −56 | VCANCAL(99) |
| 0 | PCON(100) = −57 | VCANCAL(100) |

Although the present disclosure has been described with reference to one or more examples, workers skilled in the art will recognize that changes may be made in form and detail without departing from the scope of the disclosure and/or the appended claims.

The invention claimed is:

1. A method for calibrating an information-signal transmission line, said line comprising means for generating a control signal, means for transmitting information signals controlled by said control signal and an amplifier of said information signals, said amplifier able to be configured according to at least one first gain configuration associated with a first gain value and a second gain configuration associated with a second gain value, wherein the method comprises the following steps:
obtaining, for said first gain configuration, a first plurality of first initial values VCAN1(i) of the control signal and, for said second gain configuration, a second plurality of second initial values VCAN2(i) of the control signal;
for each of the first initial values VCAN1(i) of the control signal, obtaining a first measured value PMES1(i) of the output power of the amplifier and for each of the second initial values VCAN2(i) of the control signal, obtaining of a second measured value PMES2(i) of the output power of the amplifier;
said first and second pluralities of initial values being such that the range of values of a first set formed by the first measured values PMES1(i) of the output power and the range of values of a second set formed by the second measured values PMES2(i) of the output power overlap,
for at least one setpoint value called a recovery value PCON(i) of the output power of the amplifier,
among the first measured values of the output power, obtaining the first measured value PMES1(j) of the output power closest to said recovery setpoint value PCON(i),
among the second measured values of the output power, obtaining the second measured value PMES2(k) of the output power closest to said recovery setpoint value PCON(i);
calculating, using a first modelling of the polynomial type associated with said first closest measured value PMES(j), a first calibrated value VCANCAL1(i) of the control signal corresponding to said recovery setpoint value PCON(i);
calculating, using a second modelling of the polynomial type associated with said second closest measured value PMES(k), a second calibrated value VCANCAL2(i) of the control signal corresponding to said recovery setpoint value PCON(i);
selecting one of said first and second calibrated values according to at least one predetermined criterion;

and wherein said step of selecting comprises the following steps:
determining a recovery setpoint value, called a switching recovery setpoint value, according to a predetermined criterion or predetermined criteria;
for each recovery setpoint value strictly less than the switching recovery setpoint value, selecting the first calibrated value;
for each recovery setpoint value greater than or equal to the switching recovery setpoint value, selecting the second calibrated value.

2. The method according to claim 1, wherein the predetermined criterion or predetermined criteria belong to the group including:
minimization of an electrical consumption of the amplifier of the transmission line;
compliance with at least one condition linked to noise generated by the amplifier.

3. The method according to claim 2, wherein said group further comprises the following criterion: influence of the temperature of the amplifier on properties of the amplifier.

4. The method according to claim 1, wherein the method comprises the following steps:
determining a reference switching recovery setpoint value for a given reference temperature;
obtaining a current temperature of the amplifier;
determining a current switching recovery setpoint value according to the current temperature and said reference switching recovery setpoint value.

5. The method according to claim 1, wherein said transmission line of information signals is compliant with the UMTS standard.

6. The method according to claim 1, wherein the amplifier is a double-gain power amplifier.

7. A non-transitory storage medium, which can be read by a computer, storing a set of instructions that can be executed by said computer in order to implement a method for calibrating an information-signal transmission line, said line comprising means for generating a control signal, means for transmitting information signals controlled by said control signal and an amplifier of said information signals, said amplifier able to be configured according to at least one first gain configuration associated with a first gain value and a second gain configuration associated with a second gain value, wherein the method comprises the following steps:
obtaining, for said first gain configuration, a first plurality of first initial values VCAN1(i) of the control signal and, for said second gain configuration, a second plurality of second initial values VCAN2(i) of the control signal;
for each of the first initial values VCAN1(i) of the control signal, obtaining a first measured value PMES1(i) of the output power of the amplifier and for each of the second initial values VCAN2(i) of the control signal, obtaining of a second measured value PMES2(i) of the output power of the amplifier;
said first and second pluralities of initial values being such that the range of values of a first set formed by the first measured values PMES1(i) of the output power and the range of values of a second set formed by the second measured values PMES2(i) of the output power overlap,
for at least one setpoint value called a recovery value PCON(i) of the output power of the amplifier,
among the first measured values of the output power, obtaining the first measured value PMES1(j) of the output power closest to said recovery setpoint value PCON(i), among the second measured values of the output power, obtaining the second measured value PMES2(k) of the output power closest to said recovery setpoint value PCON(i);

calculating, using a first modelling of the polynomial type associated with said first closest measured value PMES j), a first calibrated value VCANCAL1(i) of the control signal corresponding to said recovery setpoint value PCON(i);

calculating, using a second modelling of the polynomial type associated with said second closest measured value PMES(k), a second calibrated value VCANCAL2(i) of the control signal corresponding to said recovery setpoint value PCON(i);

selecting one of said first and second calibrated values according to at least one predetermined criterion;

and wherein said step of selecting comprises the following steps:

determining a recovery setpoint value, called a switching recovery setpoint value, according to a predetermined criterion or predetermined criteria;

for each recovery setpoint value strictly less than the switching recovery setpoint value, selecting the first calibrated value;

for each recovery setpoint value greater than or equal to the switching recovery setpoint value, selecting the second calibrated value.

8. A device for calibrating a transmission line of information signals, said line comprising means for generating a control signal, means for transmitting information signals controlled by said control signal and an amplifier of said information signals, said amplifier able to be configured according to at least one first gain configuration associated with a first gain value and a second gain configuration associated with a second gain value, wherein the device comprises:

means of obtaining, for said first gain configuration, a first plurality of first initial values VCAN1(i) of the control signal and, for said second gain configuration, a second plurality of second initial values VCAN2(i) of the control signal;

for each of the first initial values VCAN1(i) of the control signal, means of obtaining a first measured value PMES1(i) of the output power of the amplifier and for each of the second initial values VCAN2(i) of the control signal, obtaining a second measured value PMES2(i) of the output power of the amplifier;

said first and second pluralities of initial values being such that the range of values of a first set formed by the first measured values PMES1(i) of the output power and the range of values of a second set formed by the second measured values PMES2(i) of the output power overlap, for at least one setpoint value called the recovery value PCON(i) of the output power of the amplifier, among the first measured values of the output power, means for obtaining the first measured value PMES1(j) of the output power closest to said recovery setpoint value PCON(i), among the second measured values of the output power, means for obtaining the second measured value PMES2(k) of the output power closest to said recovery setpoint value PCON(i);

means for calculating, using a first modelling of the polynomial type associated with said first closest measured value PMES(j), a first calibrated value VCANCAL1(i) of the control signal corresponding to said recovery setpoint value PCON(i);

means for calculating, using a second modelling of the polynomial type associated with said closest second measured value PMES(k), a second calibrated value VCANCAL2(i) of the control signal corresponding to said recovery setpoint value PCON(i);

means for selecting one of said first and second calibrated values according to at least one predetermined criterion;

and wherein said means for selecting include:

means for determining a recovery setpoint value, called switching recovery setpoint value, according to a predetermined criterion or predetermined criteria;

means for selecting the first calibrated value, activated for each recovery setpoint value determined strictly less than the switching recovery setpoint value;

means for selecting the second calibrated value, activated for each recovery setpoint value determined greater than or equal to the switching recovery setpoint value.

\* \* \* \* \*